INVENTOR.
JIŘI HRDINA

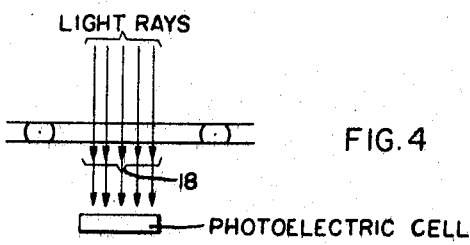
FIG. 4
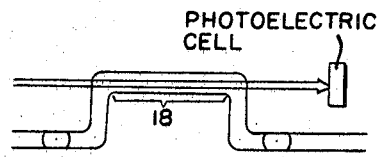
FIG. 5
FIG. 6
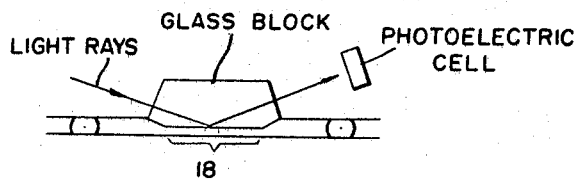
FIG. 7
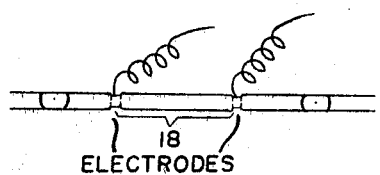

United States Patent Office 3,422,667
Patented Jan. 21, 1969

3,422,667
METHOD OF EVALUATING THE CONCENTRATION GRADIENTS IN LIQUIDS
Jiří Hrdina, Prague, Czechoslovakia, assignor to Ceskoslovenska akademie ved, Prague, Czechoslovakia, a corporation of Czechoslovakia
Filed May 3, 1966, Ser. No. 547,307
Claims priority, application Czechoslovakia, May 5, 1965, 2,935/65
U.S. Cl. 73—53            8 Claims
Int. Cl. G01n 11/02

ABSTRACT OF THE DISCLOSURE

Evaluating the concentration gradients in a medium flowing through capillary tubes of analyzers, particularly of analyzers of mixtures of amino acids, by separating sections of said medium in said capillary tube by means of a second medium immiscible with said first medium, thereafter determining the actual position of a section of said medium to be analyzed, and finally adjusting the relative position of the analyzing means with respect to said section so as to check the conditions within a chosen part of said section.

---

Figure 1:
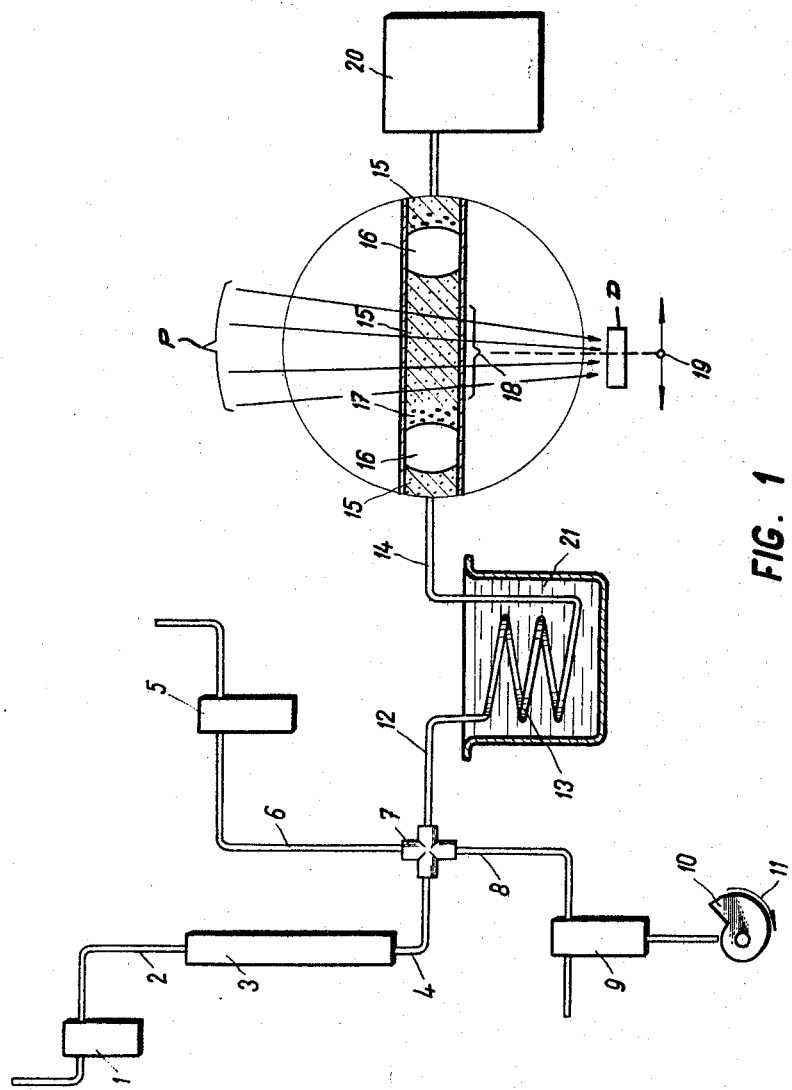

This invention relates to a method of evaluating the concentration gradients in liquids flowing in capillary tubes of analysers, more particularly of analysers of mixtures of amino acids. The invention includes also a device for carrying out said method.

In some apparatus used in laboratory techniques, more particularly in up-to-date very efficient types or analysers of mixtures of amino acids and similar materials the above indicated evaluation has to be accomplished with the smallest possible unwanted reduction of the concentration gradients, which is obtained, for example by separation of the mixtures on a chromatographic column. Any decrease of this separation resulting from the commonly employed method where a mixture of an eluate with a reaction reagent passes through a long capillary reactor under increased temperature can be reduced in some cases by using bubble pistons which divide the stream of the liquid into individual sections separated from each other. In front of the evaluating device proper, for example of a photometer, the mentioned division into sections is sometimes eliminated by removing the bubbles and generally any medium which does not mix with the reaction mixture, from the stream before evaluation. After this removal, the individual sections separated from each other join again into an undivided continuous stream and this leads to an undesirable decrease of the concentration gradients. This is of course unadmissible in devices required to work with maximum efficiency. Such cases require steps to ensure that the final evaluation takes place in the various sections separated by bubble pistons. This however is difficult because even in the case of absolutely accurate dosing of gas bubbles in equal time intervals into the eluent stream in front of the reactor, there is produced a certain unstability at the ends of the device at the evaluating places in the positions of the individual bubbles. Under ideal circumstances the bubbles behind the reactor should maintain their accurate position relative to the evaluation device.

Due to various circumstances which are difficult to control it is however quite impossible to maintain this ideal state. The said positions of the bubbles do not remain constant but change regularly in a certain continuous manner so that sometimes the bubbles are systematically delayed, while at other times they are accelerated. But there remain fundamental conditions which must be met by any proper evaluation namely to evaluate always the same sections for example always the $x$th section in a row starting with zero at the place at which the bubble is impressed.

It is an object of this invention to achieve that the above mentioned conditions are met, particularly the condition that as far as possible not only a certain section or its part, but particularly the central part thereof sufficiently distant from the limiting bubbles to be measured. These safety measures are particularly necessary because as a rule in the spaces closely in front and behind the bubbles segregated solid, liquid or gaseous particles are collecting, so that at these places it is much less possible to achieve absolute homogeneity which is a condition of correct evaluation.

The main feature of the invention resides therein that sections of the evaluated liquid separated from each other by pistons of a second medium immiscible with the liquid pass in accordance with a certain program through the evaluation device in such a manner that the relative position of an evaluation sensing element with respect to the section of the liquid remains the same at the moment of measurement. In accordance with the invention, the relative position of the evaluation sensing element with respect to the section of the liquid can be adjusted by a pressure change inside the capillary, or by a pressure change acting on the capillary or part of the tube in such a manner that the position of the bubble is adjusted with respect to the stationary sensing element. The relative position of the measuring sensing element with respect to the section of the liquid can however be adjusted also by adjusting the position of the sensing element with regard to the bubble, or by keeping the sensing element stationary. The moments at which the actual measurement is carried out can be adjusted.

For carrying out the method in accordance with the invention, a device may be used wherein the evaluation sensing element is arranged on a slidable base member, the position of which is adjusted by a mechanism controlled by pulses from a photoelectric sensing element directed upon the alternating sections of liquid and of bubbles in the capillary. But the method in accordance with the invention may also be carried out in a device with an optical system for determining the boundaries between the sections moving in the capillary which contains a member for compensating the rate of movement of these boundaries, more particularly in an embodiment where a light source directed upon the alternating sections of liquid and of bubbles in the capillary is arranged along this capillary in such a way that it throws a light beam upon a rotating polyangular prism, the rotation of which is controlled in such a manner that the image of the measured place in the capillary remains stable with respect to the light sensitive member upon which impinges the beam reflected by the prism.

Figure 2:
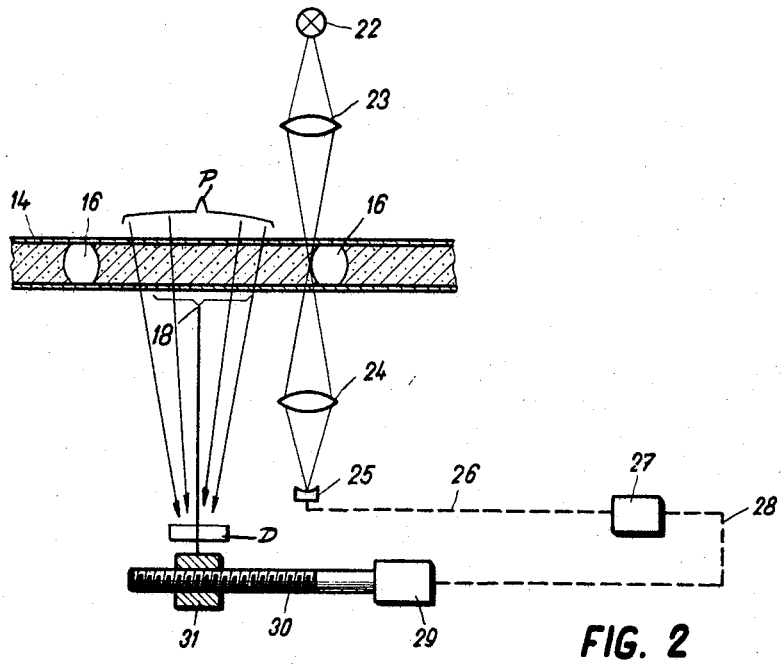
Figure 3:
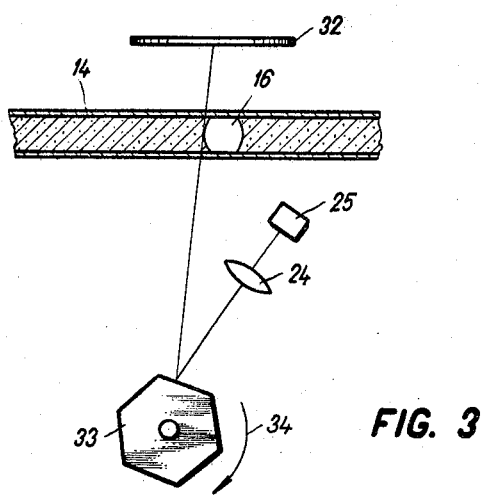

The invention will be best understood from the following specification to be read in conjunction with the accompanying drawing, in which:

FIG. 1 shows schematically the principles of the device and the means applied therein;

FIGS. 2 and 3 illustrate details of an embodiment of the device, including an analyser for complicated mixtures of amino acids and similar materials and FIGS. 4 to 7 each illustrates respectively, a possible by itself known embodiment of the analyzing means as illustrated in FIG. 1 the pump 1 delivers an eluent to and through column 3, over the connecting tube 2. The eluate leaving the column 3 through the tube 4 reaches the four-way junction 7 where it mixes with an evaluation reagent, for example ninhydrin, pumped thereinto by the pump 5 through the tube 6. Into this junction 7, or close thereto opens also the tube 8 which supplies from pump 9, in accordance with a program, accurate does of a gas providing separate gas pistons and thus sectionizing the eluent.

The pump 9 feeds the respective doses of gas almost instantaneously under action of a mechanism represented by a cam 10 rotating in the direction of the arrow 11. The eluate enters through the tube 4 into the mixing junction 7 at a more or less uniform rate; the ninhydrin evaluation reagent arrives through the tube 6 in separate pulses, conveniently always at moments when a gas bubble is forced through the tube 8 into the junction 7. This condition can be achieved by suitable synchronisation of the pumps 5 and 9. The resulting reaction mixture consisting of individual sections of eluent separated from each other by gas bubbles is supplied by the tube 12 into the capillary 13 contained in the capillary reactor 21 from where it flows after completed reaction through the tube 14 into the proper evaluation device of the through-flow type illustrated enlarged within the shown circle. The sections 15 of the liquid are separated by bubble pistons 16 next to which accumulate segregates indicated by dots 17. The central part of the section 15 in which the proper evaluation takes place is marked by the bracket 18 and may be thus identified. This central part may move and thus be a little displaced in the course of the measuring operation forward or backward in the direction of the flow as indicated by the double arrow 19. The evaluation tubular device opens either into the free space or into a chamber 20 in which the pressure may be regulated by known means. The mentioned undesirable movement of the central part 18 is caused by non-controllable influences or by influences which can be kept constant only with difficulty, as for example by slight temperature changes in the bath 21 which increases the temperature of the reaction capillary 13. Even slight temperature changes may have a rather substantial effect on the size of the individual bubble 16 and thus also on their resulting position with respect to the evaluation device. Another influence may for example result from the existing outer pressure acting upon the terminal part of the evaluation device and on the reaction capillary and the other tubings which consist of capillaries usually made of synthetic materials having a relatively low modulus of elasticity and manifesting a certain degree of elastic recovery and similar properties which are difficult to control.

The above used expressions "capillaries" or "capillary tubes" define tubes of an internal diameter where bubbles of a gaseous medium or drops of a liquid medium separating the individual sections of the analyzed medium remain intact in the course of flow of both media through said tubes. In practice tubes of an internal diameter below ⅛ of an inch can be used.

It will be understood that by convenient pressure regulation in the chamber 20 the above mentioned influences may be compensated so that the central part 18 of the measured evaluation section will remain at the given moment in the same position with respect to the evaluation device and the bubbles 16 will remain at substantially the same relative places.

It is also possible to achieve the desired relative immobility of the central part 18 of the measured section with respect to the evaluation sensing element by changing the position of the sensing element in such a manner that at moments of measurement it corresponds to variable positions of the central section 18 of the measured section. This can be achieved in that the position of the bubbles 16 is determined at certain programmed moments for example by photoelectric means, and the corresponding device ascertains the position of these bubbles at the respective moments of measurement together with changes in the position of the evaluation sensing element in such a manner as to achieve the above mentioned relative position of the sensing element with respect to the section.

FIG. 2 shows the terminal part of tubing 14 with the evaluation device. The positions of the bubbles 16 or of its rear meniscus, is determined at given movements by means of a photoelectric sensing element consisting substantially of a light source 22, a lens 23, a further lens 24 from which rays impinge on a light sensitive member 25. The electric signal transmitted by way of the leads 26 indicates whether the light from the light source 22 passes through a liquid section 15 or through a bubble 16 and it is evaluated in accordance with known principles by the device 27 in such a manner that it affects one another connection 28 indicated by dotted lines a servomotor 29 which sets into rotation a threaded guide spindle 30 displacing a nut 31 either to the right or to the left so that as required the center part 18 of the measured section coincides with the corresponding position of a proper sensing means associated and performing movements with the nut 31. This sensing means comprises as shown in FIGS. 1 and 2 a photoelectric element O receiving light rays P passing through the central portion 18. This means may of course be omitted if a pressure chamber 20 is used as indicated in FIG. 1.

FIG. 3 illustrates schematically an additional device which can be alternatively used in connection with the arrangement according to FIG. 2. Its purpose is to cause that during the movement of the section the bubble 16 or for example, its rear meniscus remains in permanent spacial coincidence with the photoelectric sensing elements. The light source is here for example an illuminated plate 32 or an elongated filament of an incandescent lamp arranged laterally of the evaluation tube 14. The optical system is in this case provided with a rotating polyangular prism 33 which rotates in direction of the arrow 34 at such a speed that the image of the rear meniscus of the bubble 16 even during its movement remains stationary with regard to the light sensitive member 25 after having been focussed thereupon by the optical system 24 which may be a simple lens or a lens system.

The evaluation device referred to in the foregoing specification may be of different well known design. It measures the quality of the liquidal segment 15 in its central portion 18 by ascertaining the absorption or extinction of light rays of a photometric device in a transparent portion of the capillary tube 14 which acts as a through-flow cuvette; said light rays pass therethrough either crosswise or longitudinally as shown in FIGS. 4 and 5, respectively, or through a refractometric member such as a glass block interposed between the light source and a photoelectrical cell as shown in FIG. 6; or the device may be electrically conductrometric as shown in FIG. 7.

I claim:

1. A method of evaluation of concentration gradients in a medium flowing through capillary tubes of analysers, particularly for the analysers of mixture of amino acids comprising the steps of separating sections of said first medium in said capillary tube by means of a second medium immiscible with said first medium, determining the actual position of a section to be analyzed and adjusting the relative position of the analyzing means with respect to said section so as to check the conditions within a chosen part of said section.

2. A method as in claim 1, wherein the relative position of the analyzing means with respect to the section to be analyzed is adjusted by controlling the pressure in said capillary tubes.

3. A method as in claim 1 wherein the relative position of the analyzing means with respect to the section to be analyzed is adjusted by moving the analyzing means with respect to the capillary tube.

4. A method as in claim 1 wherein movement the analysis is timed in dependence of the determined position of said section.

5. A device for evaluation of the concentration gradients in a medium flowing through capillary tubes where sections of said medium are separated by sections of a second medium, immiscible with said first medium comprising means for determinating the position of a section of the first medium to be analyzed, means for analyzing said first medium and means for adjustment of the relative postion of the section to be analyzed with respect to the means for analyzing at the moment the analysis has to be performed.

6. A device as in claim 5 wherein said capillary tube terminates into a space, provided with pressure regulating means.

7. A device as in claim 5 comprising means for moving said device for analyzing along said capillary tube in dependence upon the determined position of the section to be analyzed.

8. A device as in claim 5 comprising a light source on one side of the capillary tube, a polyangular prism arranged on the opposite side of the capillary tube, reflecting surfaces on said polyangular prism, adapted to receive rays from said light source having passed said capillary tube, a light sensitive element, situated to receive light rays reflected from said polyangular prism, said polyangular prism adapted to be rotated at a speed permitting one of its reflecting surfaces to reflect light rays passing through a predetermined part of the moving section of said medium within a predetermined time to said light sensitive element.

References Cited

UNITED STATES PATENTS

| | | | |
|---|---|---|---|
| 2,333,791 | 11/1943 | Hutchison | 73—194 |
| 2,818,726 | 1/1958 | Amonette et al. | |
| 2,899,280 | 8/1959 | Whitehead et al. | |

S. CLEMENT SWISHER, *Primary Examiner.*

J. W. ROSKOS, *Assistant Examiner.*

U.S. Cl. X.R.

73—61, 61.1; 88—14